US008887349B2

(12) United States Patent
Lee et al.

(10) Patent No.: US 8,887,349 B2
(45) Date of Patent: Nov. 18, 2014

(54) VACUUM CLEANER

(75) Inventors: Chang Hoon Lee, Changwon (KR); Young Ho Kim, Changwon (KR); Man Tae Hwang, Changwon (KR); Hae Seock Yang, Changwon (KR); Hoi Kil Jeong, Changwon (KR)

(73) Assignee: LG Electronics Inc., Seoul (KR)

( * ) Notice: Subject to any disclaimer, the term of this patent is extended or adjusted under 35 U.S.C. 154(b) by 631 days.

(21) Appl. No.: 12/761,324

(22) Filed: Apr. 15, 2010

(65) Prior Publication Data

US 2010/0263161 A1    Oct. 21, 2010

Related U.S. Application Data

(60) Provisional application No. 61/170,006, filed on Apr. 16, 2009.

(51) Int. Cl.
| | |
|---|---|
| *A47L 9/16* | (2006.01) |
| *A47L 9/12* | (2006.01) |
| *A47L 9/00* | (2006.01) |
| *A47L 5/36* | (2006.01) |
| *B01D 50/00* | (2006.01) |
| *B01D 45/12* | (2006.01) |
| *A47L 9/10* | (2006.01) |

(52) U.S. Cl.
CPC ............... *A47L 5/362* (2013.01); *A47L 9/122* (2013.01); *B01D 2279/55* (2013.01); *A47L 9/00* (2013.01); *A47L 9/1691* (2013.01); *B01D 50/002* (2013.01); *B01D 45/12* (2013.01); *A47L 9/108* (2013.01); *A47L 9/1608* (2013.01)
USPC ........... 15/327.1; 15/347; 15/327.2; 15/327.7

(58) Field of Classification Search
CPC ......... A47L 5/362; A47L 9/00; A47L 9/1608; A47L 9/1691; B01D 46/2411
USPC .................. 15/353, 327.2, 327.7, 327.1, 347
See application file for complete search history.

(56) References Cited

U.S. PATENT DOCUMENTS

| | | | | |
|---|---|---|---|---|
| 6,195,835 B1 * | 3/2001 | Song et al. | .................... | 15/327.1 |
| 7,278,180 B2 * | 10/2007 | Pyeong | ........................... | 15/412 |
| 7,555,808 B2 * | 7/2009 | Oh et al. | ....................... | 15/327.2 |
| 7,628,833 B2 * | 12/2009 | Oh | .................................. | 55/345 |
| 7,779,505 B2 * | 8/2010 | Krebs et al. | ..................... | 15/339 |
| 8,117,713 B2 * | 2/2012 | Kasper et al. | .................. | 15/353 |
| 8,161,597 B2 * | 4/2012 | Witter et al. | .................... | 15/347 |
| 8,163,051 B2 * | 4/2012 | Yun et al. | ......................... | 55/337 |
| 2004/0163207 A1 * | 8/2004 | Oh | .................................. | 15/353 |
| 2005/0138757 A1 * | 6/2005 | Lee | ............................ | 15/327.2 |
| 2006/0207055 A1 * | 9/2006 | Ivarsson et al. | ................. | 15/353 |
| 2007/0017064 A1 * | 1/2007 | Gogel et al. | .................... | 15/352 |
| 2007/0067945 A1 * | 3/2007 | Kasper et al. | .................. | 15/353 |

(Continued)

*Primary Examiner* — William Gilbert
*Assistant Examiner* — Alp Akbasli
(74) *Attorney, Agent, or Firm* — Birch, Stewart, Kolasch & Birch, LLP

(57) ABSTRACT

A dust separating device for a vacuum cleaner is provided. The dust separating device includes a dust separating unit including a first main body movably connected to a second main body. The second main body includes a plurality of sub bodies coupled together. A vacuum cleaner is also provided. The vacuum cleaner includes a main vacuum cleaner body and a dust separating device including a dust separating unit and a filter unit. The dust separating device is detachably mounted to the main body and includes a plurality of main bodies.

18 Claims, 27 Drawing Sheets

(56) References Cited

U.S. PATENT DOCUMENTS

| | | | |
|---|---|---|---|
| 2007/0240390 A1* | 10/2007 | Becker et al. | 55/423 |
| 2007/0256272 A1* | 11/2007 | Kim | 15/347 |
| 2007/0289263 A1* | 12/2007 | Oh et al. | 55/318 |
| 2008/0022485 A1* | 1/2008 | Grey | 15/347 |
| 2009/0056060 A1* | 3/2009 | Han et al. | 15/349 |
| 2009/0056290 A1* | 3/2009 | Oh et al. | 55/337 |
| 2009/0113859 A1* | 5/2009 | Oh et al. | 55/337 |
| 2009/0293223 A1* | 12/2009 | Hwang et al. | 15/352 |
| 2009/0293915 A1* | 12/2009 | Hwang et al. | 134/21 |
| 2010/0299866 A1* | 12/2010 | Conrad | 15/353 |

* cited by examiner

VACUUM CLEANER

CROSS-REFERENCE TO RELATED APPLICATIONS

This application claims the benefit of U.S. Provisional Application No. 61/170,006, filed Apr. 16, 2009, and is herein incorporated by reference.

BACKGROUND OF THE INVENTION

1. Field of the Invention

The present invention relates generally to a vacuum cleaner, and more particularly, to a vacuum cleaner having a dust separating unit including a plurality of main bodies.

2. Description of Related Art

In general, a vacuum cleaner is an apparatus filtering dust in a dust separating device after sucking air including dust by using suction power generated by a suction motor mounted in a main body.

The vacuum cleaner can be classified into a canister scheme that a suction nozzle for sucking dust is removably provided from a main nozzle and is connected by a connection device and an upright scheme that the suction nozzle is rotatably connected to the main body.

BRIEF SUMMARY OF THE INVENTION

According to principles of this invention, a dust separating device for a vacuum cleaner is provided. The dust separating device includes a dust separating unit including a first main body movably connected to a second main body. The second main body includes a plurality of sub bodies coupled together.

In another aspect, a vacuum cleaner is provided. The vacuum cleaner includes a main vacuum cleaner body and a dust separating device including a dust separating unit and a filter unit. The dust separating device is detachably mounted to the main body and includes a plurality of main bodies.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and mechanical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
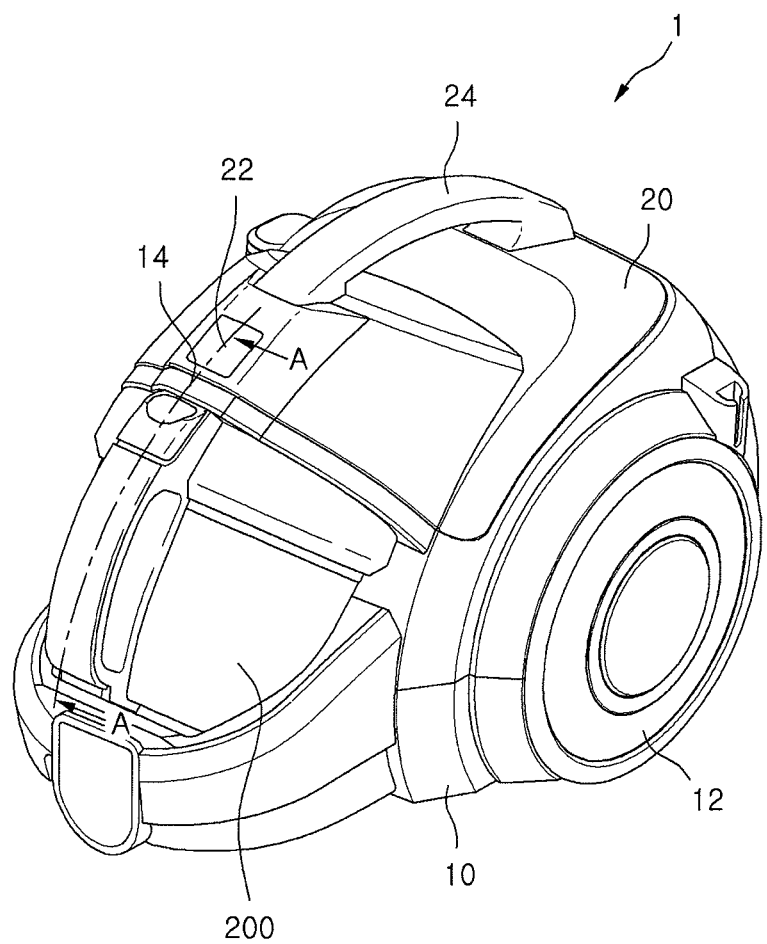
FIG. 1 is a perspective view of a vacuum cleaner in which a dust separation device according to an exemplary embodiment is provided.
Figure 2:
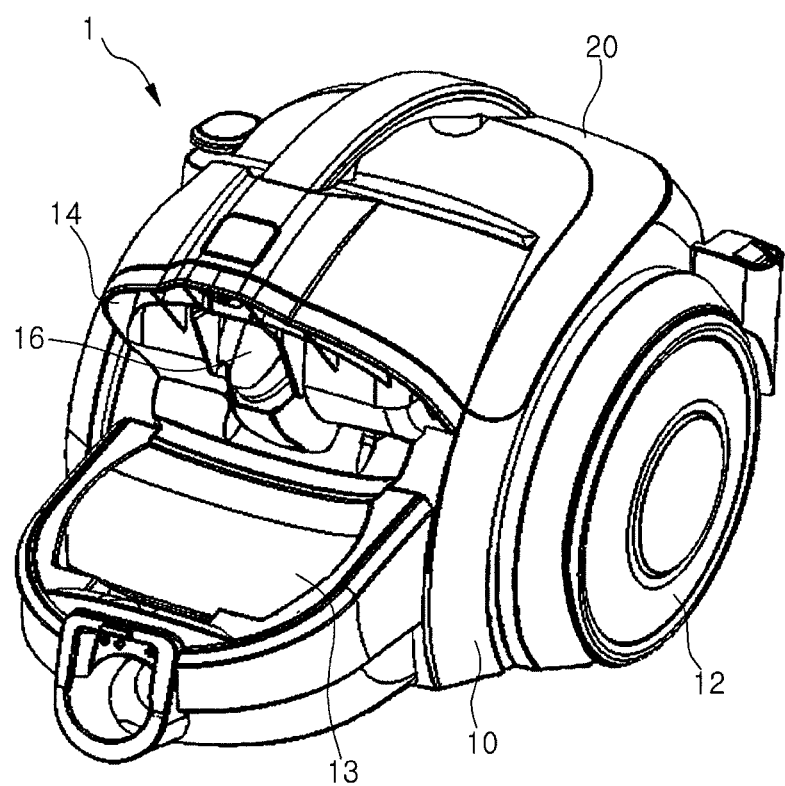
FIG. 2 is a perspective view of a vacuum cleaner from which a dust tank is separated.
Figure 3:
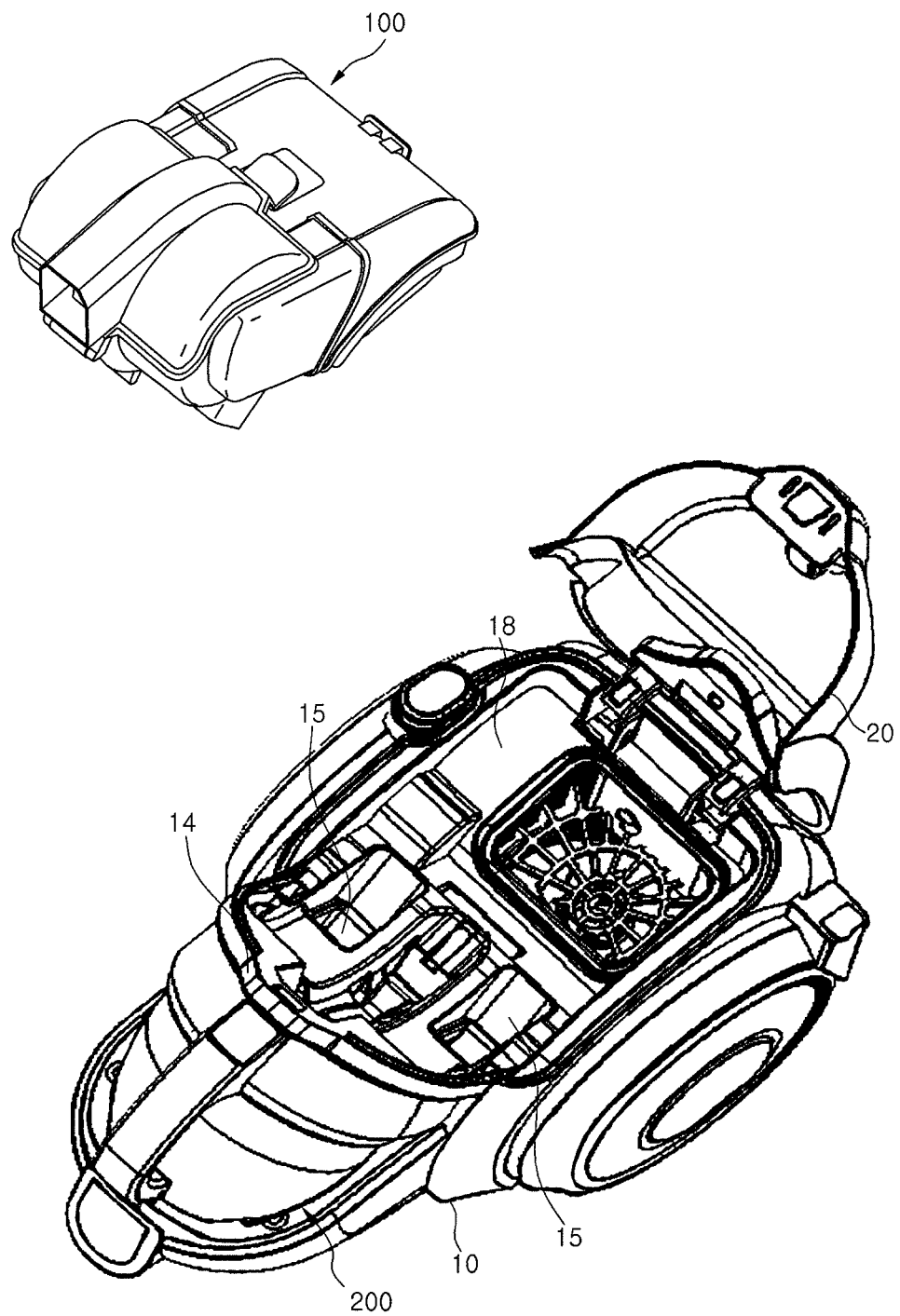
FIG. 3 is a perspective view of a vacuum cleaner from which a dust separation device is separated.

FIG. 1 is a perspective view of a vacuum cleaner in which a dust separation device according to the embodiment is provided, FIG. 2 is a perspective view of a vacuum cleaner from which a dust tank is separated, and FIG. 3 is a perspective view of a vacuum cleaner from which a dust separation device is separated.

In FIG. 1, as one example of the vacuum cleaner, a canister-type vacuum cleaner is shown, but the spirit of the embodiment can be applied even to an upright-type vacuum cleaner.

Referring to FIGS. 1 to 3, the vacuum cleaner 1 according to the embodiment includes a main body 10 with a suction motor included therein, a dust separation device 100 that is removably mounted on the main body 10 and separates dust in the air, and a dust tank 200 that is removably mounted on the main body 10 and stores dust separated from the dust separation device 100.

More specifically, a plurality of wheels that facilitate movement of the main body 10 are provided at the main body 10. The main body 10 is formed with a dust tank mounting portion 13 on which the dust tank 200 is mounted. The upper part of the dust tank mounting part 13 is formed with a fixing plate 14 for fixing the dust tank 200.

The upper part of the main body 10 is formed with a receiving part 19 in which the dust separation device 100 is received. The main body 10 is provided with a cover member 20 that covers the dust separation device 100 in the state where the dust separation device 100 is received in the receiving part 18. One end of the cover member 20 is rotatably coupled to the main body by a hinge and the other end thereof is removably coupled to the fixing plate 14.

The cover member 20 is provided with a coupling button 22 so that the cover member 20 can be coupled with the fixing plate 14. The end of the coupling button 22 is selectively locked to fixing plate 14.

As described above, as the cover member 20 covers the dust separation device 100, the dust separating device 100 is not viewed from the external, such that the finishing is enhanced.

In state where the dust separation device 100 is received in the receiving part 18, a part of the dust separation device 100 is seated to the fixing plate 14. The fixing plate 14 is formed with an opening portion 16 that moves the dust separated from the dust separation device 100 to the dust tank 200. The opening portion 16 communicates with the dust discharge portion of the dust separation device 100 to be described later.

In the embodiment, the dust separation device 100 and the dust tank 200 are provided as a separate article, such that each of them is removably mounted to the main body 10. As a result, the structure of the dust tank 200 can be simplified and the weight thereof can be light. Therefore, in order to remove dust, the user separates only the dust tank 200 from the main body 10, the convenience of the user can be improved.

Meanwhile, the fixing plate 14 is provided with a plurality of suction holes 15 that introduces air including dust to the dust separation device 100. FIG. 3 shows an example where two suction holes 15 are formed.

Hereinafter, the structure of the dust separation device will be described in more detail below.

Figure 4:
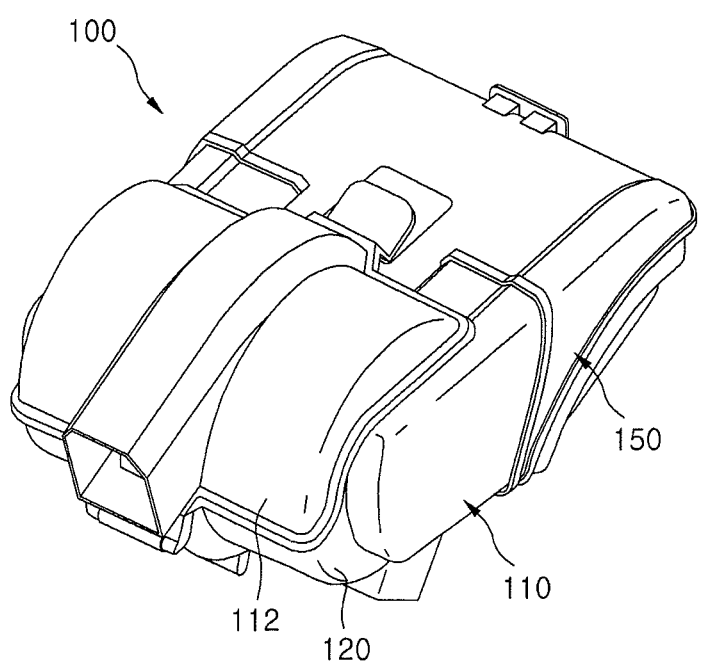
FIG. 4 is a perspective view of a dust separation device according to the exemplary embodiment.
Figure 5:
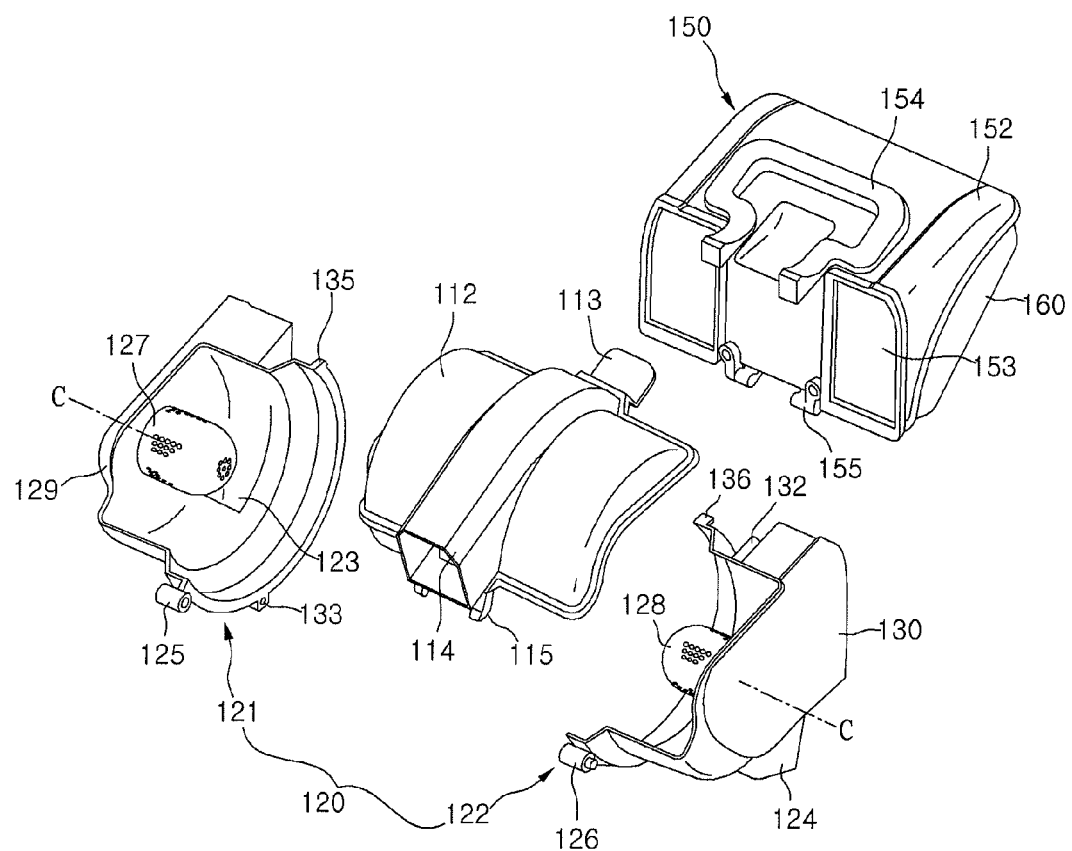
FIG. 5 is an exploded perspective view of the dust separating device.
Figure 6:
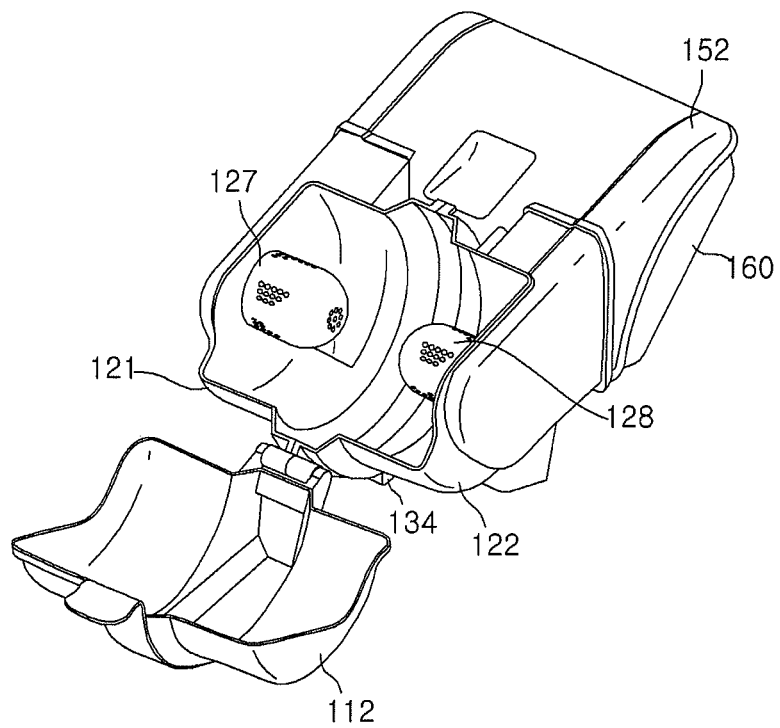
FIG. 6 is a perspective view of the dust separating device in the state where a first main body rotates.

FIG. 4 is a perspective view of a dust separation device according to the embodiment, FIG. 5 is an exploded perspective view of the dust separating device, and FIG. 6 is a perspective view of the dust separating device in the state where a first main body rotates.

Referring to FIGS. 4 to 6, the dust separation device 100 includes a dust separation unit 110 that separates dust in the air and a filter unit 150 that is coupled outside the dust separation unit 110 and filters air discharged from the dust separating unit 110.

First, the structure of the dust separation unit 110 will be described.

The dust separation unit 110 separates dust in the air by the cyclone flow. The dust separation unit 110 includes a first main body 112 and a second main body 120 that is rotatably coupled to the first main body 112.

The second main body 120 includes a first sub body 121 and a second sub body 122 that is formed in a shape corresponding to the first sub body 121 and is coupled with the first sub body 121.

In other words, in the embodiment, the dust separation unit 110 is coupled with the plurality of bodies to form a complete shape. The first sub body 121 is coupled with the second sub body 122 in a direction parallel to an axis C of a cyclone flow. Herein, the cyclone shaft C means a central axis of the cyclone flow.

As described above, as the dust separation unit 110 is completed by the coupling of the plurality of bodies, the dust separation unit 110 can be easily manufactured.

In other words, as compared with the case where one complete dust separation unit is manufactured, in the case where each of the bodies 112, 121, and 122 is manufactured, the number of molds for forming the bodies 112, 121, and 122 can be reduced and the structure of the molding can be simplified. Therefore, each body 112, 121, and 122 is easily manufactured and the manufacturing cost of the dust separation unit 110 can be reduced.

The first main body 112 is provided with a dust discharge portion 114 that discharges dust separated from air. The dust discharge portion 114 is formed at the central portion of the first main body 112. The first main body 112 is provided with a coupling lever 113 to be coupled with the second main body 120.

The first main body 112 is provided with a pair of hinges 115 to be rotatably coupled with the second main body 120. Since the first main body 112 is rotatably coupled with the second main body 120, the inside of the dust separation unit 110 can be easily cleaned while the first main body 112 rotates. Herein, the first main body is connected to the second main body in a direction substantially perpendicular to an axis C of the cyclone flow.

Meanwhile, each of the first sub body 121 and the second sub body 122 is provided with suction portions 123 and 124 that suck air and dust. That is, the dust separation unit 110 includes the plurality of suction portions 123 and 124. The suction portions 123 and 124 are extended in a tangential direction of each body 121 and 122 in order to generate the cyclone flow.

Each suction part 123 and 124 is positioned at both sides of the dust discharge portion 114. The first and second sub bodies 121 and 122 are provided with hinge coupling portions 125 and 126 to which the hinge 115 of the first main body 112 is coupled. In addition, each of the first and second sub bodies 121 and 122 is discharge holes (see 137 and 138 of FIG. 9) that discharge air from which dust is separated. A surface on which each discharge hole (see 137 and 138 of FIG. 9) is formed is coupled with filter bodies 127 and 128 that filter air.

The first and second sub bodies 121 and 122 is provided with air discharge portions 129 and 130 that moves air passing through the discharge holes (see 137 and 138 of FIG. 9) to the filter unit 150.

The first and second sub bodies 121 and 122 are provided with coupling portions 133 and 134 that are coupled with each other by a screw and a coupling boss 132 that is coupled to the filter unit 150. In addition, the first and second sub bodies 121 and 122 are provided with coupling ribs 135 and 136 to which the coupling lever 113 of the first main body 112 is coupled.

Next, the structure of the filter unit 150 will be described.

Figure 7:
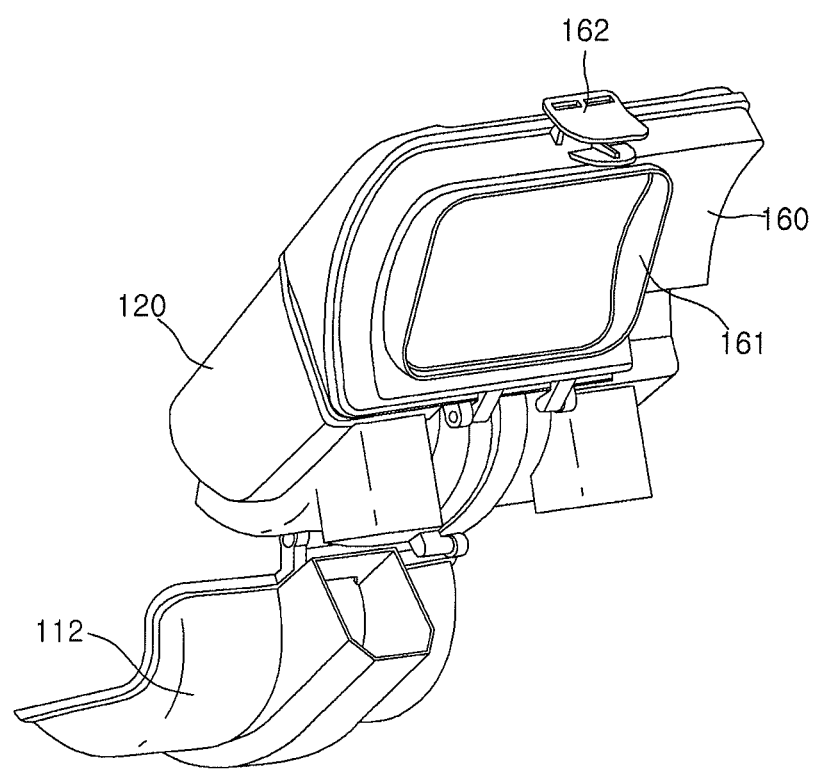
FIG. 7 is a lower perspective view of the dust separating device in the state where a first main body rotates.
Figure 8:
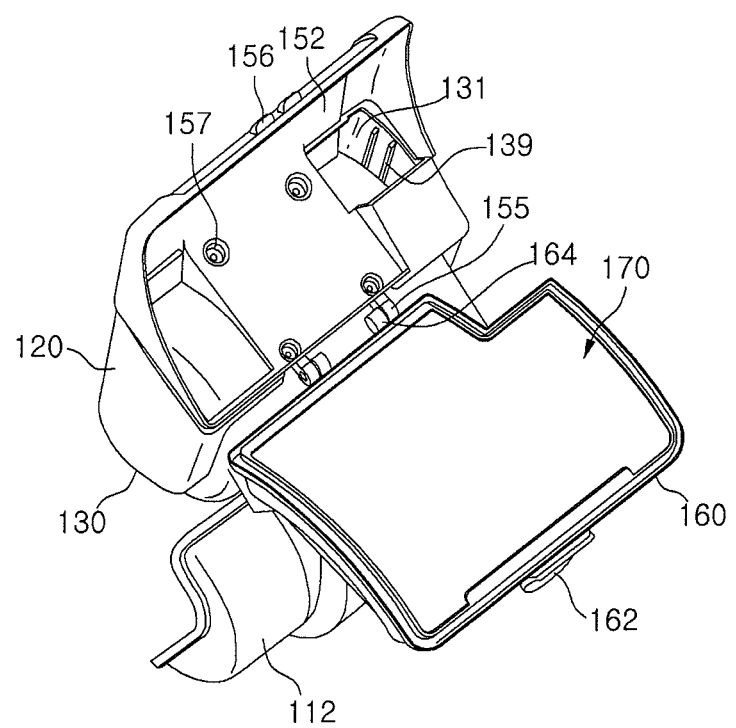
FIG. 8 is a lower perspective view of the dust separation device in the state where a second case in a filter unit rotates in FIG. 7.
Figure 9:
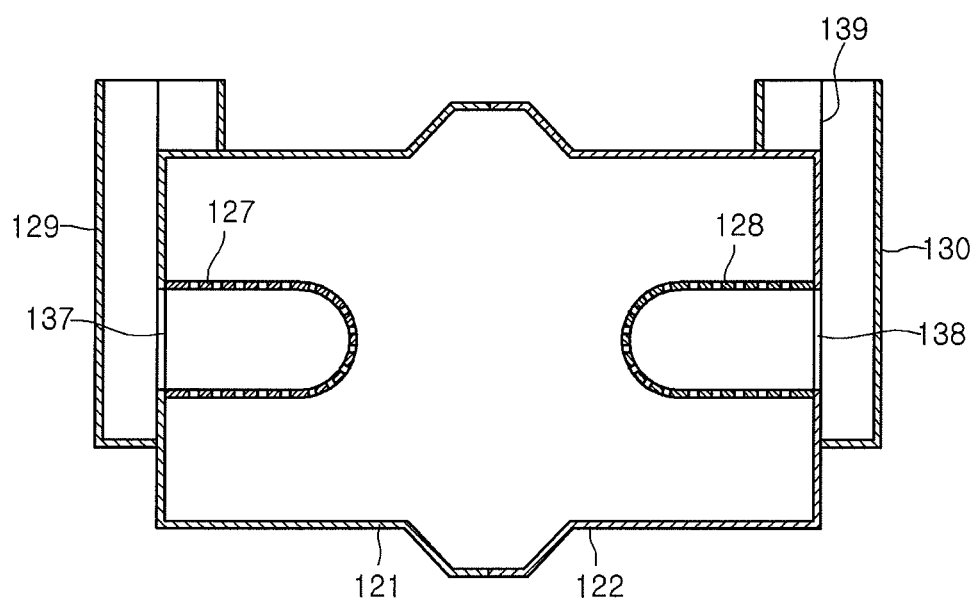
FIG. 9 is a cross-sectional view of a dust separation device according to the exemplary embodiment.

FIG. 7 is a lower perspective view of the dust separating device in the state where a first main body rotates, FIG. 8 is a lower perspective view of the dust separation device in the state where a second case in a filter unit rotates in FIG. 7, and FIG. 9 is a cross-sectional view of a dust separation device according to the embodiment.

Referring to FIGS. 4 to 9, the filter unit 150 includes a first case 152 that is coupled with the dust separating unit 110, a second case 160 that is rotatably coupled to the first case 152, and a filter 170 that is seated on the second case 160.

In detail, the first case 152 is provided with a pair of opening portions 153 into which air from the air discharge portions 129 and 130 is introduced. The upper part of the first case 152 is provided with a handle 154 that is held by the user.

The lower part of the first case 152 is provided with a pair of hinge coupling portions 155 with which a pair of hinges 164 of the second case 160 is coupled. In addition, the first case 152 is provided with a coupling protrusion 156 to which the coupling lever 162 of the second case 160 is selectively coupled.

Therefore, in the state where the second case 160 rotates with respect to the first case, the user can replace the filter 170 or can clean the filter 170.

The first case 152 is provided with a plurality of connection holes 157 to which the screw is connected. Therefore, when the plurality of connection holes 157 are connected to the screw, the screw is connected with the connection boss 132 of the dust separating unit 110, such that the filter unit 160 is coupled with the dust separating unit 110. The second case 160 is provided with the discharge hole 161 that discharges air passing through the filter 170.

As described above, since the dust separating unit 110 is coupled with the filter unit 150, when the user lifts up the filter unit 150 while the user holds the handle 154, the dust separation unit 110 and the filter unit 150 can be simultaneously drawn out from the main body 10.

Meanwhile, the inside of the air discharge portions 129 and 130 is provided with at least one noise reducing portion 139 that reduces noise generated while air flows. The noise reducing portion partitions the channel of the air discharge portions 129 and 130 into a plurality of channels and is extended in parallel with the air flowing direction from the air discharge portion.

Hereinafter, the operation of the dust separation device 100 will be described.

Air including dust is sucked into the inside of the dust separation unit 110 through the pair of suction portions 123 and 124. Therefore, as air is sucked into the dust separation unit 110 through each suction portion 123 and 124, the inside of the dust separation unit 110 is formed the pair of cyclone flows that corresponds to each other.

As described above, as the pair of cyclone flows is generated in the single space, the air flowing channel area is large and the channel loss of air is reduced, making it possible to increase the separation performance.

The pair of cyclone flow is generated at both sides of the dust separating unit 110, respectively, and is moved to the central part, such that the cyclone flows meet at the central part. That is, the air of cyclone flow moves dust in mutually convergent directions toward the dust discharge portion 114.

Therefore, a stronger cyclone flow than the cyclone flow generated at each of the suction portions 123 and 124 is generated at the central part of the dust separation unit 110.

Therefore, when the pair of cyclone flows is collected at the central part of the dust separation unit 110, the flow strength is larger than the case where the single cyclone flow is generated in the same space, thereby making it possible to more increase the separation performance of dust.

The dust moved to the central part of the dust separation unit 110 can be discharged to the outside through the dust discharge portion 114 by the strong cyclone flow, such that the discharge performance of dust can be improved.

As described above, the air sucked into the dust separating unit 110 is collected to the central part of the dust separation unit 110 while being rotated along the inner peripheral surface of the dust separation unit 110. During this process, air and dust are subjected to different centrifugal force due to their weight difference, such that they are separated.

The separated dust is discharged into the dust discharge portion 114 from the central part of the dust separation unit 110 and the discharged dust is moved along the dust discharge portion 114 and introduced into the dust tank 200.

On the other hand, air from which dust is separated is moved to the air discharge portions 129 and 130 through the filter bodies 127 and 128 and the discharge holes 137 and 138. Air discharged to the air discharge portions 129 and 130 is moved to the filter unit 150.

Meanwhile, the user can clean the inside of the dust separation unit 110 in the state where the first main body 112 rotates or replace the filter bodies 127 and 128.

Figure 10:
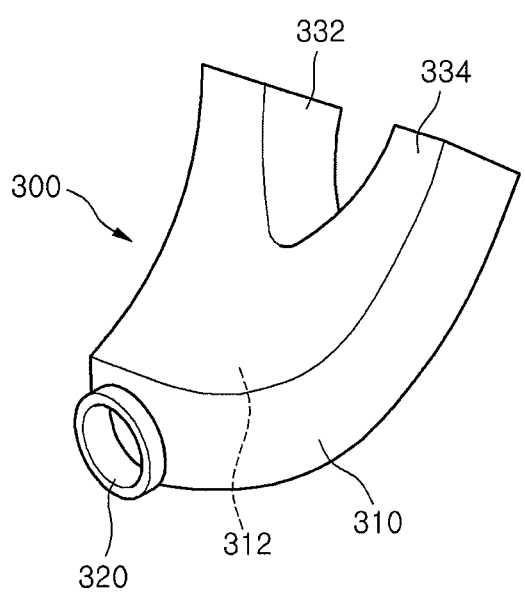
FIG. 10 is a perspective view of a distribution unit according to the exemplary embodiment.

FIG. 10 is a perspective view of a distribution unit according to the embodiment.

Referring to FIG. 10, the distribution unit 300 according to the embodiment distributes the air introduced to the main body 10 to the dust separation device 100. Although not shown, the distribution unit 300 can be provided inside the main body 10.

The distribution unit 300 includes a body 310 with a main channel 312 formed therein, a suction hole 320 that sucks air including dust into the body 310, and a pair of branch portions 332 and 334 that divides and flows air introduced into the body 310.

Therefore, the air introduced into the main channel 312 through the suction hole 320 is moved to each suction portion 123 and 124 of the dust separation unit 110 while being divided into each branch portion 332 and 334.

At this time, the suction hole 320 is formed to be inclined to any one branch portion in order to prevent large foreign materials introduced into the main channel 312 from being trapped inside the main channel.

Figure 11:
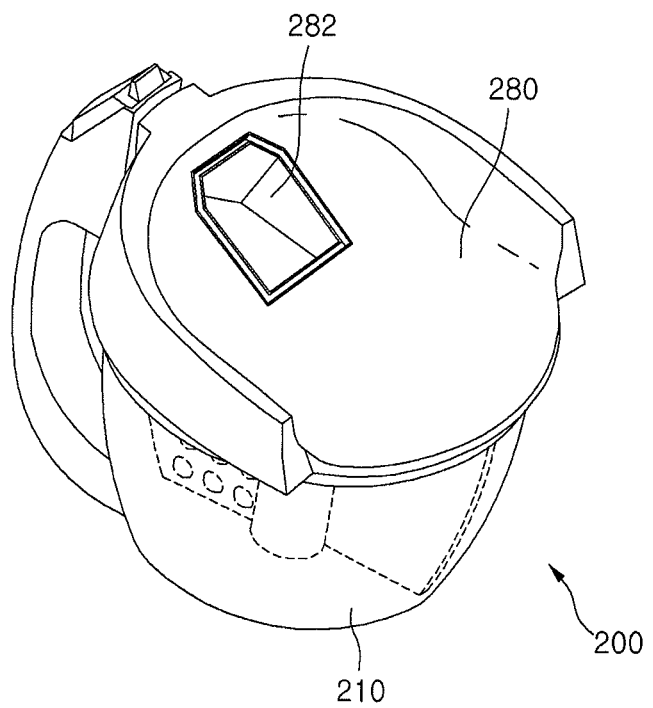
FIG. 11 is a perspective view of a dust tank according to the exemplary embodiment.
Figure 12:
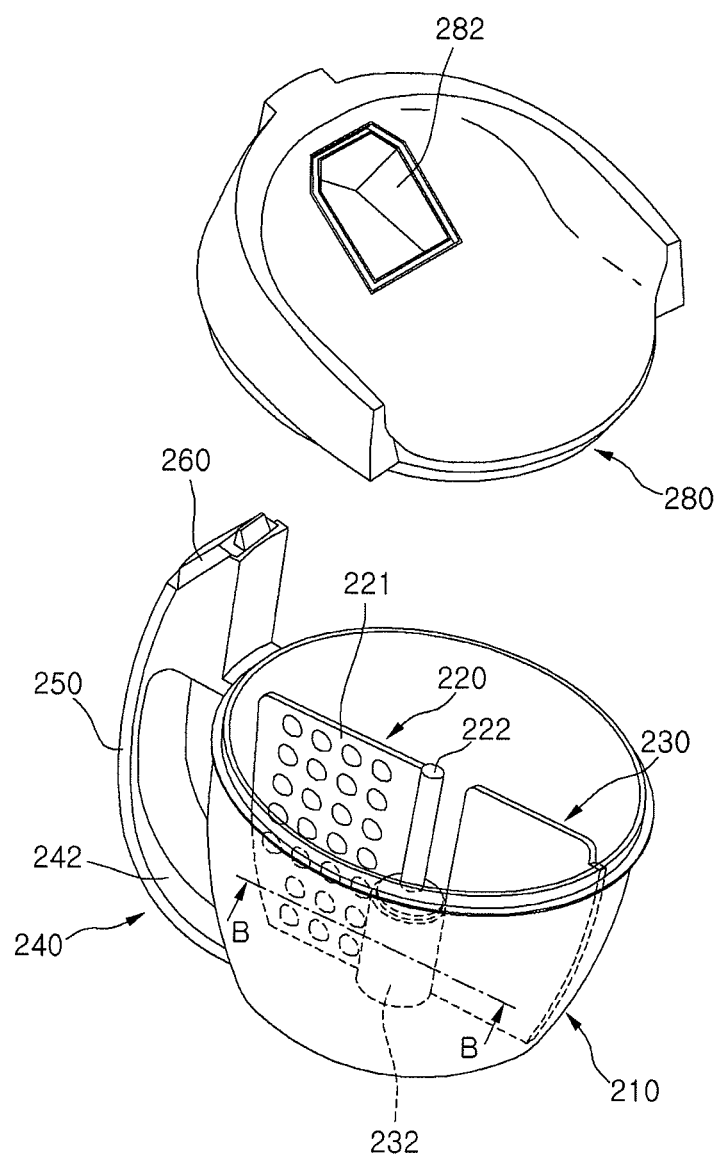
FIG. 12 is an exploded perspective view of the dust tank.
Figure 13:
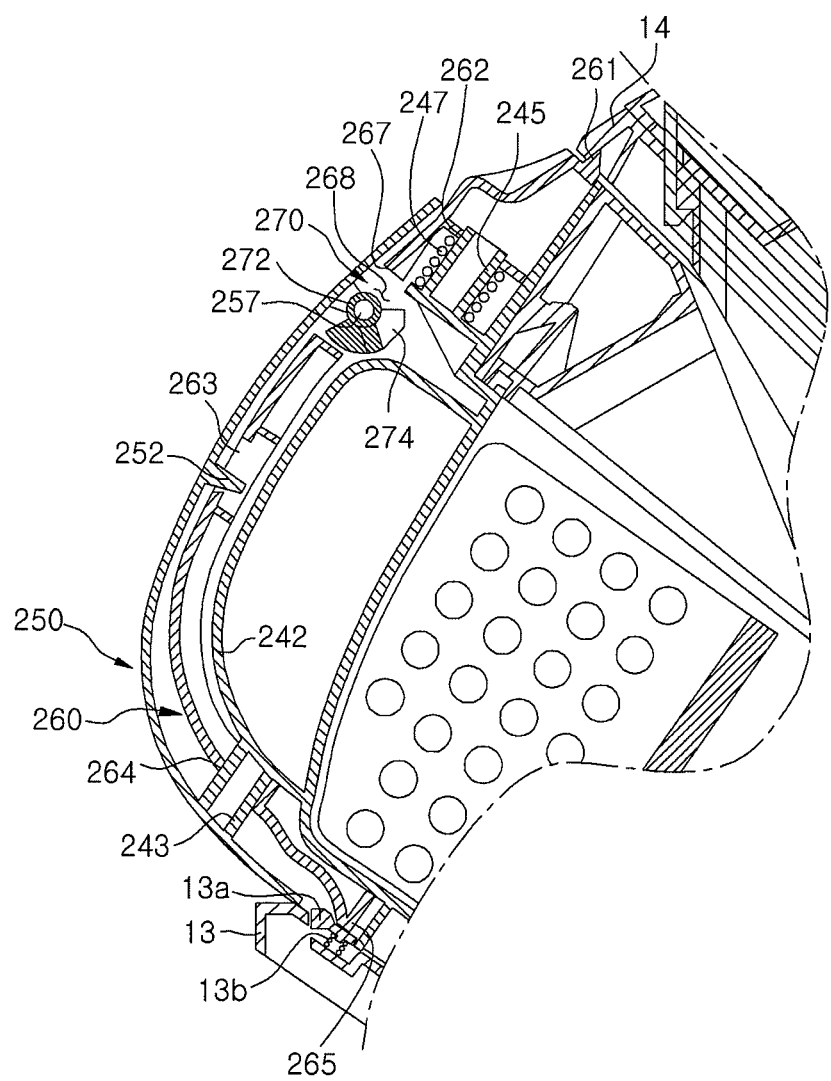
FIG. 13 is a cross-sectional view taken along line A-A of FIG. 1.

FIG. 11 is a perspective view of a dust tank according to the present embodiment, FIG. 12 is an exploded perspective view of the dust tank, and FIG. 13 is a cross-sectional view taken along line A-A of FIG. 1.

Referring to FIGS. 11 to 13, the dust tank 200 of the embodiment includes a dust collecting body 210 into which dust separated from the dust separation device 100 is stored and a cover member 280 that is coupled with the upper part of the dust collecting body 210.

In detail, the dust collecting body 210 is provided with a handle 240 that can be held by the user. The inside of the dust collecting body 210 is provided with a plurality of compression members 220 and 230 for compressing the dust stored therein. The structure of the plurality of compression members will be described below.

The cover member 280 is provided with a dust introducing portion 282 into which dust separated from the dust separation device 100 is introduced. The dust introducing portion 282 communicates with the opening portion 16 of the fixing plate 14.

Meanwhile, the handle 240 includes a handle body 242, a lever unit 260 that is movably coupled with the handle body up and down and a handle cover 250 that is coupled with the handle body 242.

In the embodiment, the upper movement of the lever unit 260 means a moving direction so that the lever unit 260 is coupled with the main body (or fixing plate) and the lower movement of the lever unit 260 means a moving direction so that the lever unit 260 is separated from the main body (or fixing plate).

The handle body 242 is provided with an upper guider 245 and a lower guider 243 that guide the up and lower movement of the lever unit 260. The lever unit 260 is provided with holes 262 and 264 into which each guider 243 and 245 is inserted.

The circumference of the upper guider 245 is provided an elastic member that elastically supports the lever unit 260.

The upper part of the lever unit 260 is provided with a first coupling portion 261 to be selectively coupled with the fixing plate 14 and the lower part of the lever unit 260 is provided with a second coupling portion 265 that is selectively locked to a locking portion 13a that is provided in the dust tank mounting portion 13.

The locking portion 13a is supported by the elastic member 13b and is protruded to the upper part of the dust tank mounting portion 13 in the state where the dust tank 200 is not mounted on the dust tank mounting portion 13.

The locking portion 13a is pressurized downward by the second coupling portion 265 while the dust tank 200 is mounted on the dust tank mounting portion 13 and when the dust tank 200 is completely mounted on the dust tank 13, the locking portion 13a is locked to the second coupling portion 265.

When the lever unit 260 is moved downward to separate the dust tank 200 from the dust tank mounting portion 13, the locking portion 13a is moved downward y the second coupling portion 265. In this state, when the dust tank 200 is pulled forward, the second coupling portion 265 passes through the locking part 13a.

Meanwhile, the handle cover 250 is provided with an intermediate guider 252 that guides the up and lower movement. The lever unit 260 is provided with a guide hole 263 into which the intermediate guider 252 is inserted. The guide hole 263 is formed up and down.

The handle cover 250 is rotatably coupled with a stopper 270 that selectively prevents the movement of the lever unit 260. The handle cover 250 is provided with a rotation shaft 257 to be coupled with the stopper 270.

The stopper 270 prevents the movement of the lever unit 260 in the state where it rotates with respect to the lever unit 260.

In detail, the stopper 270 includes a rotation body 272 that is coupled with the rotation shaft 257 and a stop guide 274 that is protrudedly formed from the rotation body 272.

The lever unit is provided with a space portion 268 in which the stopper is received. In addition, the lever unit 260 includes a contact portion 267 that selectively contacts the stopper 270 during the lower movement.

Hereinafter, the operation of the stopper 270 will be described.

Figure 14:
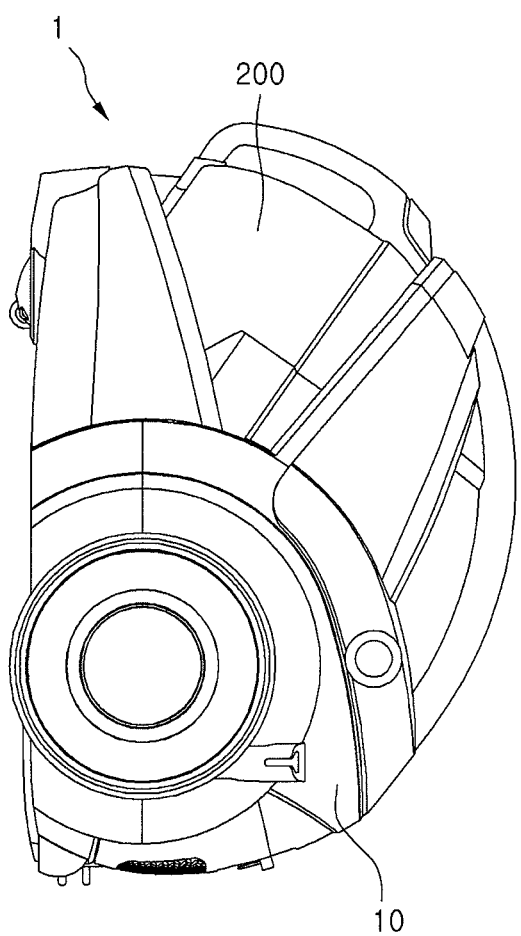
FIG. 14 is a diagram showing a state where a main body stands upright in the state where the dust tank is mounted on the main body.
Figure 15:
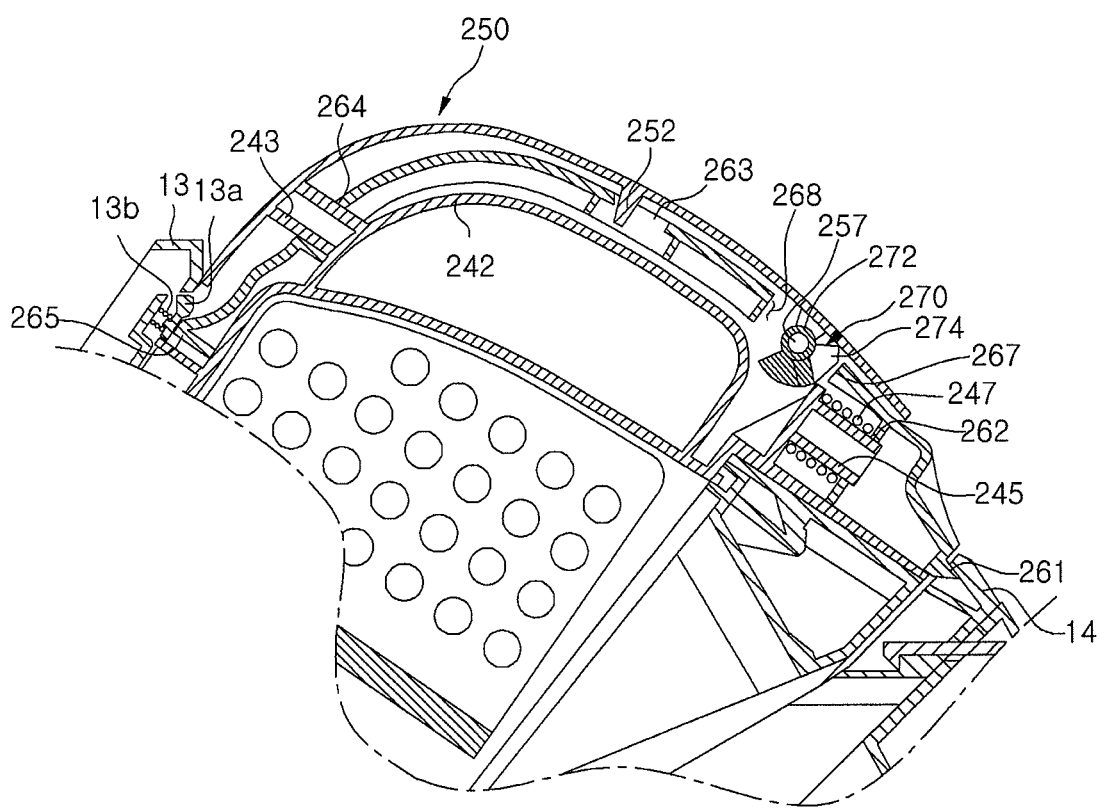
FIG. 15 is a cross-sectional view showing an inner structure of a handle in the same state as FIG. 14.

FIG. 14 is a diagram showing a state where a main body stands upright in the state where the dust tank is mounted on the main body. FIG. 15 is a cross-sectional view showing an inner structure of a handle in the same state as FIG. 14.

Referring to FIG. 1 and FIGS. 12 to 15, in the same state as FIG. 1, the rotation body 272 and the stop guide 274 of the stopper 270 are separated from the contact portion 267 in the state where they are received in the space portion of the lever unit 260 (see FIG. 13). The state of the above-mentioned stopper 270 is called a first state.

Then, the lever unit 260 can be moved up and down in the handle 240, such that the dust tank 200 can be coupled or separated with or from the main body 10.

On the other hand, as shown in FIG. 14, when the main body 10 stands upright, the stopper rotates, such that the stop guide 274 is positioned between the rotation shaft 257 and the contact portion 267 as shown in FIG. 15. As such, the movement of the contact portion 267 is prevented.

The state as shown in FIG. 14 is a state where the user holds and moves the handle 240 of the dust tank 200, for example, when the dust tank 200 is mounted on the main body 10. With the embodiment, since the movement of the lever unit 260 is prevented by the rotation of the stopper 270 in the same state as FIG. 14, the dust tank 100 is separated from the main body 10, such that it prevents the main body 10 from falling from the bottom surface.

Hereinafter, air flow inside the vacuum cleaner will be described.

When the suction power is generated by the suction motor provided inside the main body 10, air including dust is introduced into the main body 10. Air introduced into the main body 10 is distributed into each suction portion 123 and 124 after air introduced into the main body 10 is introduced into the distribution unit 300.

The air introduced into the dust separation unit 110 is separated from dust while it is spirally moved along the inner peripheral surface of the dust separation unit 110. The separated dust is discharged to the dust discharge unit 114 and the air of the dust discharge portion 114 is moved to the dust tank 200 through the opening portion 16 of the fixing plate 14 and the dust introducing portion 252.

On the other hand, the separated air is discharged from the dust separation unit 110 and is moved to the filter unit 150. The air moved to the filter unit 150 is introduced into the main body 10 after being filtered while passing through the filter 170. The air introduced into the main body 10 is discharged to the outside of the main body 10 after passing through the suction motor.

Next, the structure of the compression member will be described in more detail.

Figure 16:
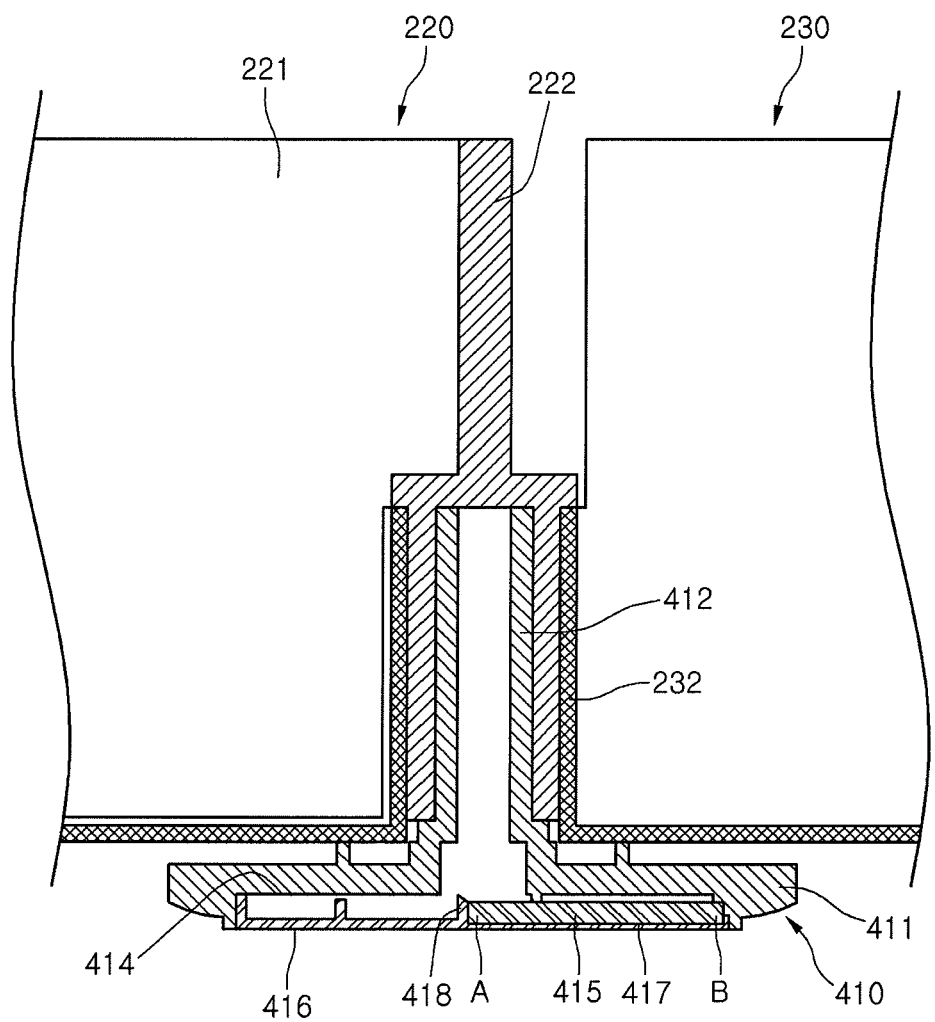
FIG. 16 is a cross-sectional view taken along line B-B of FIG. 12.
Figure 17:
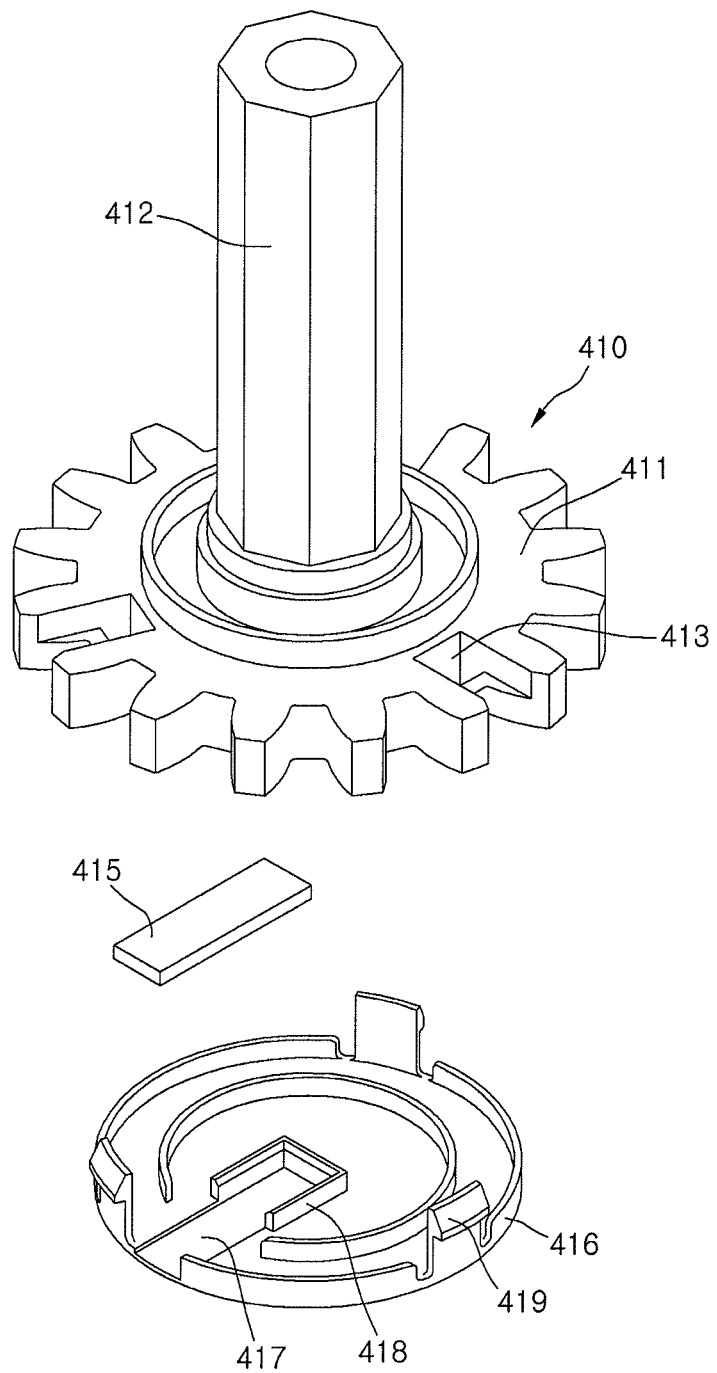
FIG. 17 is an exploded perspective view of a driven gear according to the exemplary embodiment.
Figure 18:
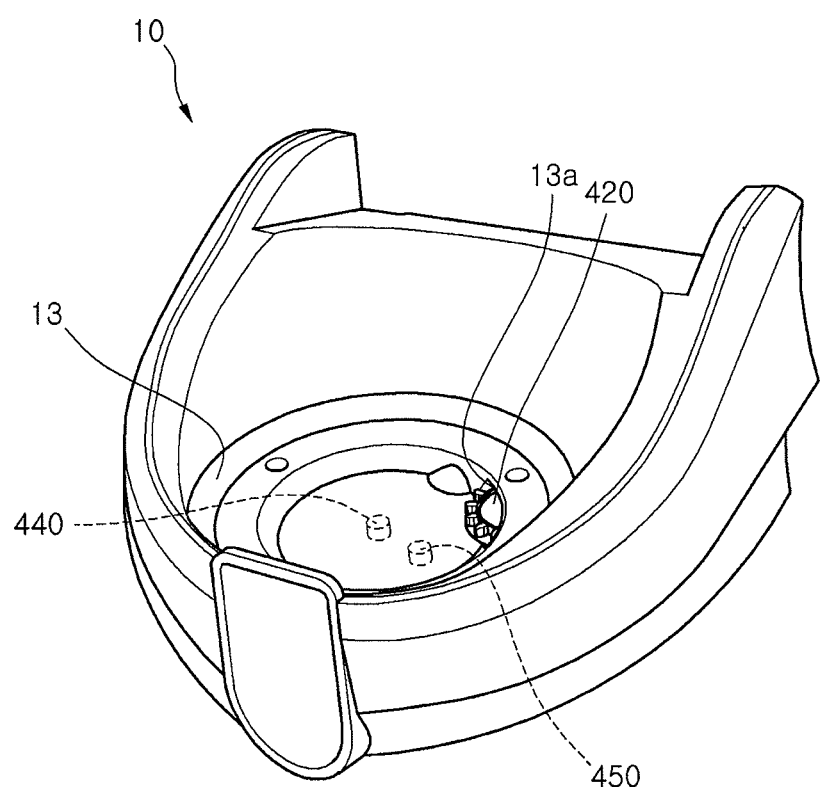
FIG. 18 is a perspective view of a dust tank mounting portion according to the exemplary embodiment.

FIG. 16 is a cross-sectional view taken along line B-B of FIG. 12, FIG. 17 is an exploded perspective view of a driven gear according to the embodiment, and FIG. 18 is a perspective view of a dust tank mounting portion according to the embodiment.

FIG. 12 and FIGS. 16 to 18, the plurality of compression members include a first compression member 220 that is rotatably coupled with the dust collecting body 210 and a second compression member 230 that is integrally formed with the dust collecting body 210. The compression member 230 is integrally formed with a fixing shaft 232 that is protruded upward from the bottom surface of the dust collecting body 210. The first compression member 220 includes a compression plate 221 that compresses dust by the interworking with the second compression member 230 and a rotation shaft 222 that is integrally formed with the compression plate 221. The rotation shaft 222 is coupled with the fixing shaft 232.

The first compression member 220 rotates by the driving device. In detail, the driving device includes a driving source that generates a driving force and a power transfer portions 410 and 420 that transfer the driving power of the driving source to the first compression member 220. The compression motor can be applied as the driving source. The power transfer portions 410 and 420 includes a driven gear 410 that is coupled with the first compression member 220 and a driving gear 420 that transfers the driving power of the compression motor to the driven gear 410. The driving gear 420 is coupled with the rotation shaft of the compression motor and rotates by the compression motor.

In detail, the driven gear 410 includes a gear body 411 on which a plurality of gear teeth are formed and a gear shaft 412 that is vertically extended upward with respect to the gear body 411 and a cover 416 on which the magnetic member 415 is seated and is coupled with the lower part of the gear body 411. The gear shaft 412 of the driven gear 410 is coupled the rotation shaft 222 of the first compression member 220 at the lower part of the dust collecting body 210. As described above, the shaft 412 of the driven gear 410 is coupled with the rotation shaft 222 of the first compression member 220 at the lower part of the dust collecting body 210 such that the driven gear 410 is exposed to the outside of the dust collecting body 210. The lower part of the gear body 411 is provided with the receiving portion 414 in which the cover 416 is received in the state where the cover 416 is coupled therewith. The receiving portion 414 is formed to be depressed upward from the bottom surface of the gear body 411. The gear body 411 is provided with a plurality of hook coupling holes 413 to which a plurality of hooks 419 formed to be spaced from each other along the circumference of the cover are coupled.

The magnetic member 415 is formed in a rectangular bar shape. The cover 416 is formed to be depressed in a shape where a seating groove 417 in which the magnetic member 415 is seated corresponds to the magnetic member 415. The seating groove 417 is radially extended from the central part of the cover 416. A part of the circumference of the seating groove 417 is formed with a guide rib 418 that guides the position of the magnetic member. The cover 416 is coupled with the lower part of the gear body 411 in the state where the magnetic member 415 is seated on the cover 416. Therefore, when the gear body 411 rotates, the magnetic member 415 rotates together with the gear body 411.

In the embodiment, since the position of the cover 416 is fixed to be with the driven gear 410 in the state where the magnetic member 415 is seated on the cover 416, it will be described that the magnetic member 415 is seated on the driven gear 410. Therefore, the driven gear 410 may be referred to the magnetic member seating portion. In this case, the cover 416 can perform a role of covering the magnetic member in the state where the magnetic member is seated at the magnetic member.

Meanwhile, the compression motor is provided at the inner side of the dust tank mounting portion 13 and the driving gear 420 is coupled with the shaft of the compression motor and is provided at the bottom surface of the dust tank mounting portion 13. A part of the outer circumferential surface of the driving gear 420 is exposed to the outside from the lower part of the dust tank mounting part 13. The lower part of the dust tank mounting part 13 is provided with the opening portion 13a that exposes a part of the outer circumferential surface of the driving gear 420 is exposed to the dust tank mounting portion 13. As the driving gear 420 is exposed to the dust tank mounting portion 13, when the dust tank 200 is mounted on the dust tank mounting portion 13, the driven gear 410 engages with the driving gear 420. Herein, as the compression motor the motor that can be rotated in a two way can be used. Therefore, the first compression member 220 can be rotated in a positive direction (clockwise) and a reverse direction (anticlockwise) and since the first compression member 220 rotates in a positive direction and a reverse direction, the compressed dust is accumulated at both sides of the second compression member 230. As described above, a synchronous motor can be used as the compression motor so that the compression motor can be rotated in a positive direction and a reverse direction.

Meanwhile, the inside of the mounting portion 13 is provided with the plurality of magnetic sensors that sense magnetism that is generated from the magnetic member 415. In detail, the magnetic sensor includes a first magnetic sensor 440 that senses the mounting of the dust tank 200 and a second magnetic sensor 450 that senses the position of the driven gear 410 or the position of the first compression member 220. The hall sensor can be applied to each of the magnetic sensors 440 and 450.

The first magnetic sensor 440 is provided at the central part of the mounting portion 13 that senses the magnetism of one end A of the magnetic member 415. The second magnetic sensor 450 is positioned to be spaced from the first magnetic sensor 440 to sense the magnetism of the other end B of the magnetic member 415. At this time, in order for the second magnetic sensor 450 to effectively sense the magnetism generated from the magnetic member, the second magnetic sensor 450 is positioned at the vertical lower part of the trace drawn by the magnetic member 415 when the driven gear 410 rotates in the state where the dust tank 200 is mounted on the dust tank mounting portion 13. Therefore, the first magnetic sensor 440 always senses the magnetism in the state where the dust tank 200 is mounted on the dust tank mounting portion 13. On the other hand, while the driven gear 410 rotates, the second magnetic sensor 415 senses the magnetism of the magnetic member 415 only when the magnetic member 415 is positioned at the upper part of the second magnetic sensor 450, thereby making it possible to confirm the rotation position of the driven gear 410 or the first compression member 220. The detailed description thereof will be described below.

Figure 19:
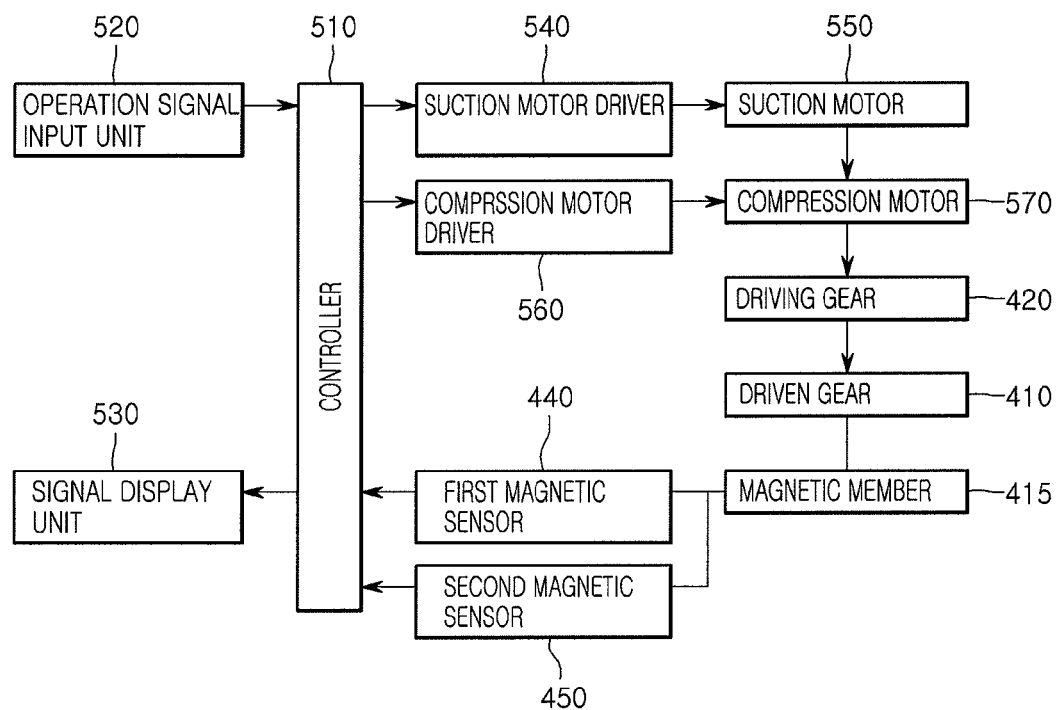
FIG. 19 is a block diagram showing a controlling device of a vacuum cleaner according to the present invention.

FIG. 19 is a block diagram showing a controlling device of a vacuum cleaner according to the embodiment.

Referring to FIG. 19, the vacuum cleaner according to the embodiment includes a controller 510, an operation signal input unit 520 that selects the suction power (for example, strong, middle, weak modes), a signal display unit 530 that displays an emptying signal of dust stored in the dust tank 200 and the dust tank unmounting signal, a suction motor driver 540 that operates the suction motor 550 according to the operation mode input from the operation signal input unit 520, a compression motor driver 560 that operates the compression motor 570, a driving gear 420 that is driven by the compression motor 570, a driven gear 410 that rotates engaging with the driving gear 420, a magnetic member 415 that is provided in the driven gear 410, and a first magnetic sensor 440 and a second magnetic sensor 450 that senses the magnetism of the magnetic member 415.

In detail, when the dust tank 200 is not mounted on the mounting portion 13, the first magnetic sensor 440 does not sense the magnetism of the magnetic member 415. Therefore, when the operation signal is from the operation signal input unit 520 in the above-mentioned state, the controller 510 displays the dust tank unmounting signal in the signal display unit 530.

The controller 510 determines the dust amount stored in the dust tank 200 based on the position of the driven gear that is sensed in the second magnetic sensor 450 and when it is determined that dust is stored exceeding a reference amount, the dust emptying signal is displayed in the signal display unit 530. Herein, since the driven gear 410 is coupled with the first compression member 220, confirming the position of the driven gear 410 can be understood as confirming the position of the first compression member 220. Therefore, since the first magnetic sensor 440 senses the mounting of the dust tank 220, it may be referred to as a 'dust tank sensor' and since the second magnetic sensor 450 confirms the position of the first compression member 220, it may be referred to as a "position sensor".

The signal displayed in the signal display unit 530 may be an auditory signal or a visual signal, or vibration directly transferred to the user. As the signal display unit 530, a speaker, an LED, etc., can be used. The signal displayed in the signal display unit 530 can be set to be different from the dust emptying signal and the dust tank unmounting signal.

Figure 20:
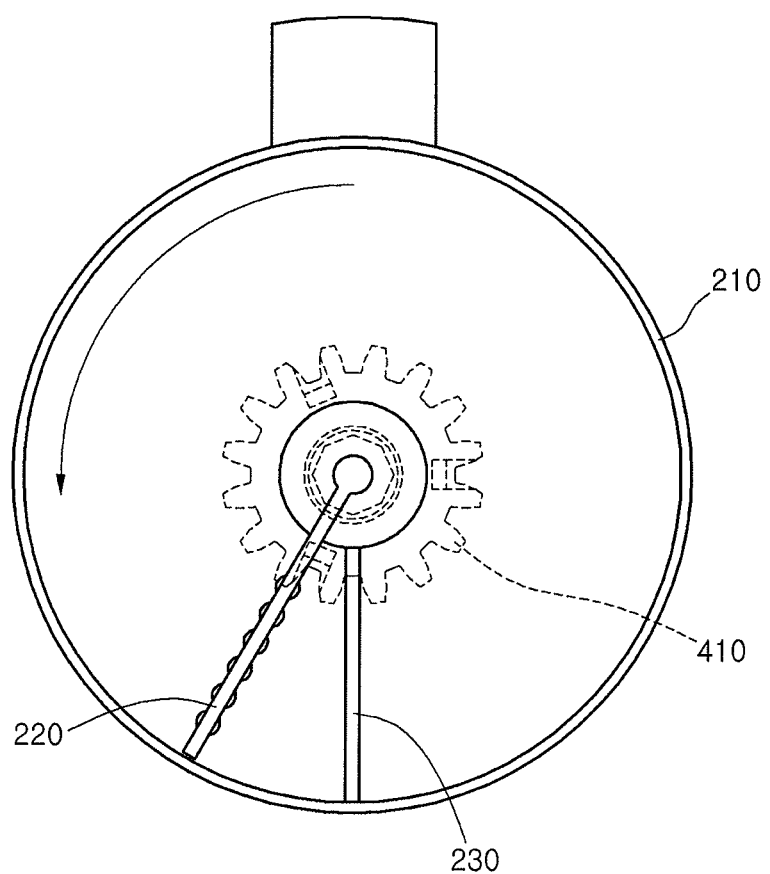
FIGS. 20 and 21 are diagrams showing a positional relation between a magnetic element and a second magnetic sensor when a first compression member for compressing dust is adjacent to one side of the second compression member.
Figure 21:
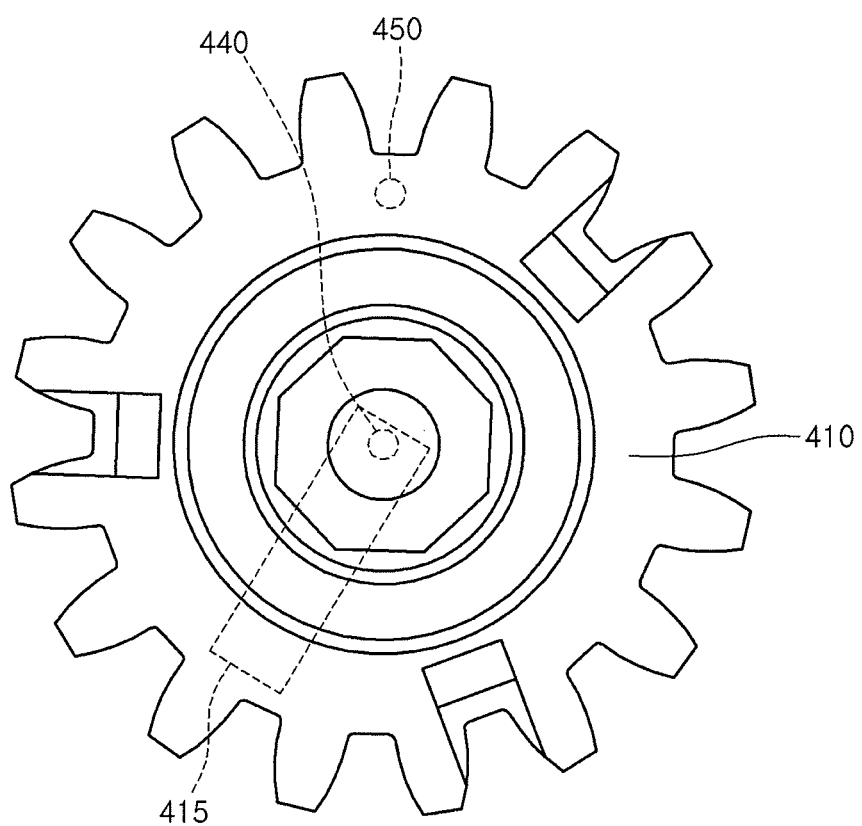
Figure 22:
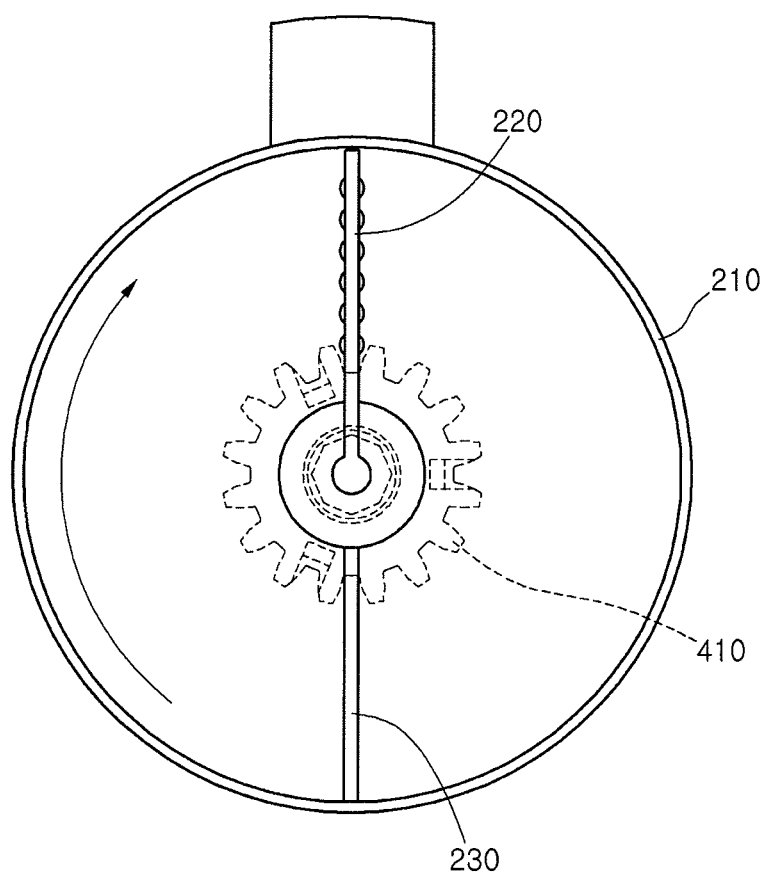
FIGS. 22 and 23 are diagrams showing a positional relation between a magnetic element and a second sensor when the first compression member and the second compression member are on a straight line.
Figure 23:
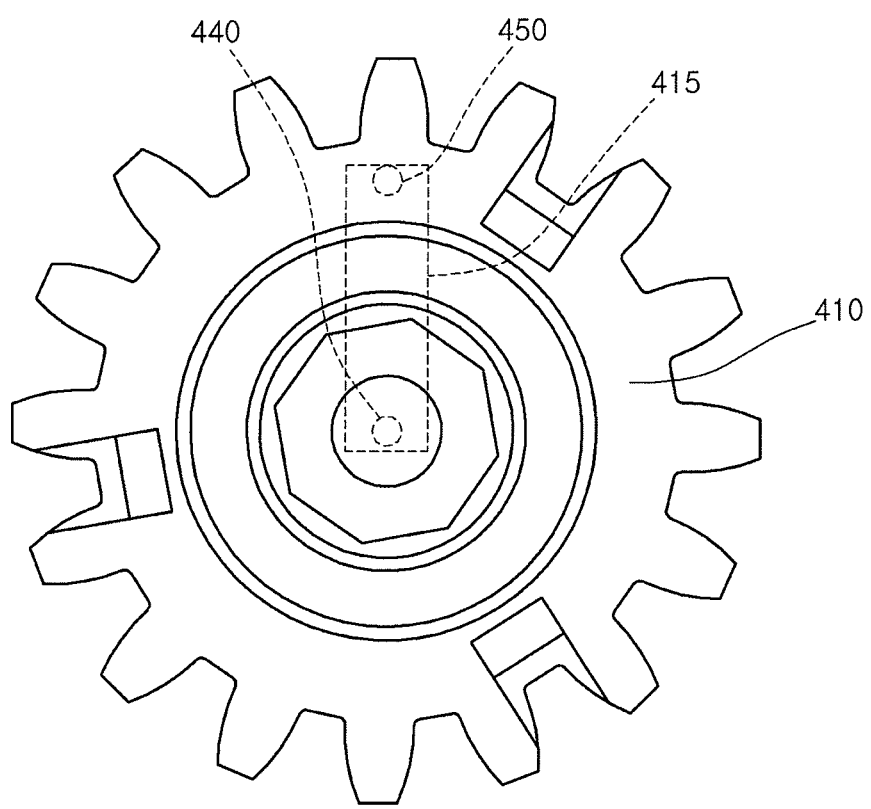
Figure 24:
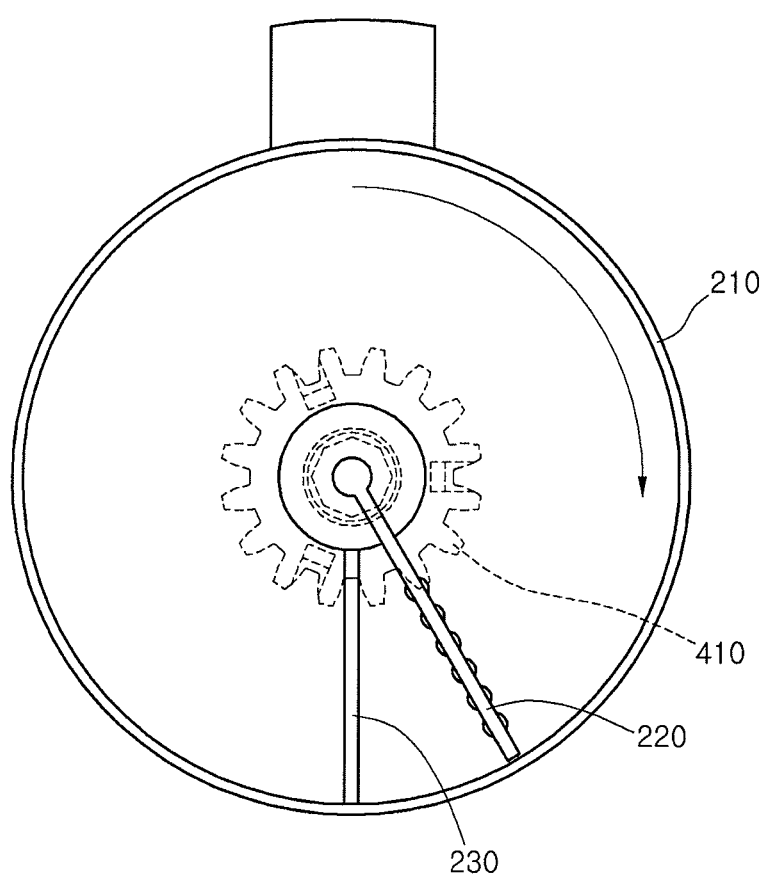
FIGS. 24 and 25 are diagrams showing a positional relation between the magnetic element and the second sensor when the first compression member is adjacent to the other side of the second compression member.
Figure 25:
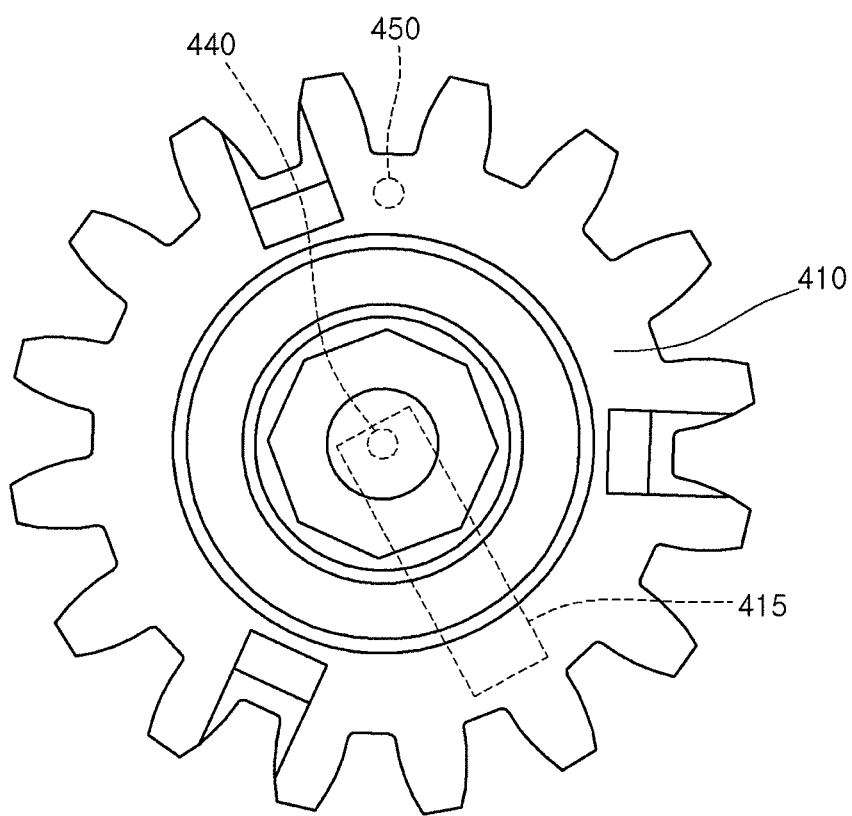

FIGS. 20 and 21 are diagrams showing a positional relation between a magnetic element and a second magnetic sensor when a first compression member for compressing dust is adjacent to one side of the second compression member. FIGS. 22 and 23 are diagrams showing a positional relation between a magnetic element and a second sensor when the first compression member and the second compression member are on a straight line. FIGS. 24 and 25 are diagrams showing a positional relation between the magnetic element and the second sensor when the first compression member is adjacent to the other side of the second compression member.

As can be appreciated from FIGS. 20 to 25, in the embodiment, when the first compression member 220 is positioned on a straight line by rotating at an approximately 180□ based on the second compression member 230, the magnetic member 415 is positioned at the vertical upper part of the second magnetic sensor 450, such that the second magnetic sensor 450 senses the magnetism of the magnetic member 415.

Herein, the position of the first compression member 220 shown in FIG. 22 that indicates the state where the second magnetic sensor 450 senses the magnetism of the magnetic member 415 is referred to as a "reference position" for convenience of explanation. When the first compression member 220 compresses dust accumulated in the dust tank 200 while it rotates anticlockwise as shown in FIG. 20 from the reference position, the magnetic member 415 is spaced from the second magnetic sensor 450, such that the magnetism is not sensed in the second magnetic sensor 450. When the first compression member 220, which is rotating anticlockwise, is not rotated any more, the first compression member 220 rotates clockwise. Therefore, the first compression member 220 passes through the reference position shown in FIG. 22 and rotates to the right of the second compression member 230 as shown in FIG. 21, such that it compresses the dust accumulated in the dust tank 200. When the first compression member 230, which is rotating clockwise, is not rotated any more, the compression motor 570 rotates anticlockwise and repeatedly performs the above-mentioned process, such that it compresses the dust accumulated in the dust tank 200.

Figure 26:
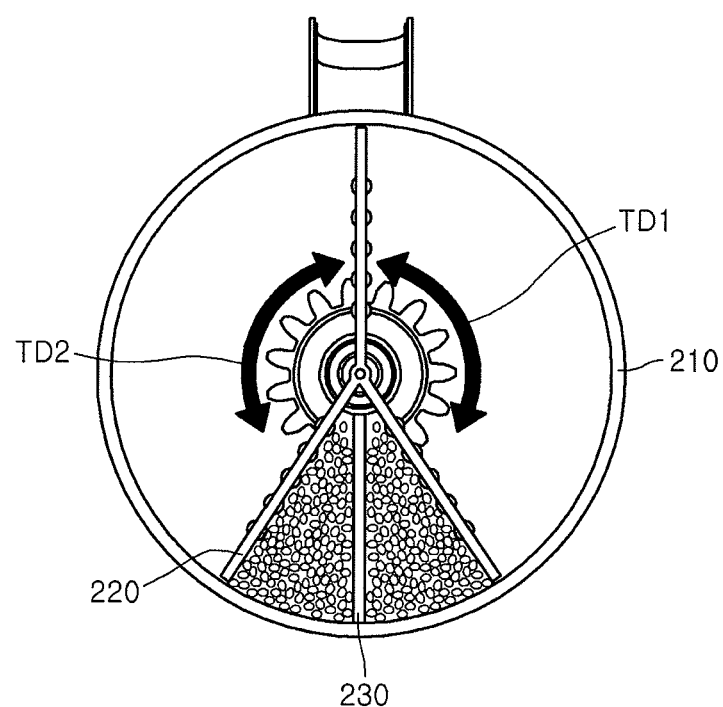
FIG. 26 is a diagram generally showing a rotation operation of the first compression member described in FIGS. 20 to 25.

FIG. 26 is a diagram generally showing a rotation operation of the first compression member described in FIGS. 20 to 25.

FIG. 26 shows a time TD1 that the first compression member 220 rotates clockwise as shown in FIG. 24 from the reference position and is back returned to the reference position and a time TD2 that the first compression member 220 rotates anticlockwise as shown in FIG. 20 from the reference position and is back returned to the reference position.

For convenience of explanation, the time TD1 is referred to as a first round-trip time and the time TD2 is referred to as a second round-trip time. Generally, since dust is uniformly spread inside the dust collecting body 210, the first round-trip time TD1 and the second round-trip time TD2 may be approximately the same.

Figure 27:
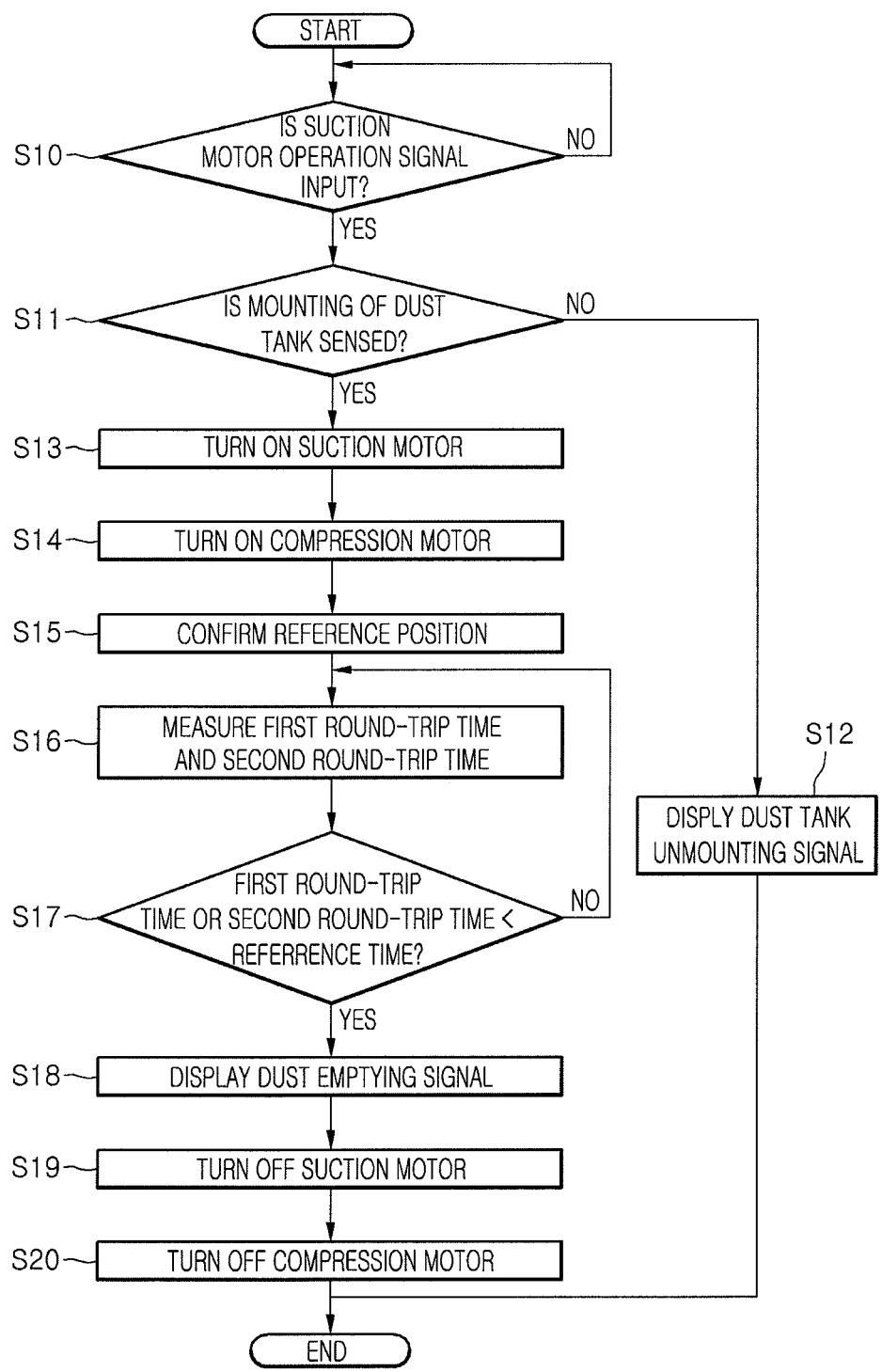
FIG. 27 is a flow chart describing a control method of a vacuum cleaner according to the exemplary embodiment.

FIG. 27 is a flow chart describing a control method of a vacuum cleaner according to the embodiment.

Referring to FIG. 27, it is determined whether the suction motor operation signal is input through the operation signal input unit 520 in the state where the operation of the vacuum cleaner stops (S10). If it is determined that the suction motor operation signal is input, it is determined whether the dust tank 200 is mounted (S11). When the dust tank 200 is not mounted, the first magnetic sensor 440 does not sense the magnetism of the magnetic member 415, such that the controller 510 displays the dust tank unmounting signal in the signal display unit 530 (S12). When the suction motor operation signal is input in the state where the dust tank 200 is not mounted, the operation of the unnecessary suction motor can be prevented by informing the condition to the outside.

On the other hand, when it is determined that the dust tank 200 is mounted by sensing the magnetism in the first magnetic sensor 440, the controller 510 operates a suction motor driver 540 to drive the suction motor 550 according to the suction power selected by the user (S13). When the suction motor 550 is operated, dust is sucked through the suction nozzle by the suction power of the suction motor 550. Air sucked through the suction nozzle is introduced into the cleaner main body 10. When the suction power is generated by the suction motor provided in the cleaner main body 10, air including dust is introduced into the cleaner main body 10. The air introduced into the cleaner main body 10 is introduced into the distribution unit 300 and is then distributed into each suction portion 123 and 124 of the dust separation device 100. The dust separated from the dust separation device 100 is stored in the dust tank 200. The operation of the dust separation device 100 is described above and therefore, the detailed description thereof will be omitted.

While dust is stored in the dust tank 200, the controller 510 drives the compression motor 570 in order to compress the dust stored in the dust tank 200 (S14). The embodiment uses the scheme of driving the compression motor 570 after driving the suction motor 550, but another embodiment can simultaneously operate the suction motor 550 and the compression motor 570.

In the step (S14), when the compression motor 570 is driven, the driving gear 420, which is coupled with the rotation shaft of the compression motor 570, rotates. When the driving gear 420 rotates, the driven gear 410, which engages with the driving gear, rotates. When the driven gear 410 rotates, the first compression member 220 compresses dust while rotating to the second compression member 230 side. At this time, the controller 510 first confirms whether the first compression member 220 is positioned at the reference position (S15). When the first compression member 220 is positioned at the reference position, the second magnetic sensor 450 senses the magnetism of the magnetic member 415. Therefore, the controller 510 determines the first round-trip time TD1 or the second round-trip time TD2 of the first compression member 220 based on the time point when the second magnetic sensor 450 first senses magnetism (S16). The controller 510 includes a counter portion that measures each round-trip time.

Herein, as the amount of dust compressed in the dust tank 200 is increased by the first compression member 220 and the second compression member 230, the left and right round-trip rotation time of the driven gear 410 or the first compression member 220 is shortened. The controller 510 determines the first round-trip time TD1 and the second round-trip time TD2 of the first compression member through the second magnetic sensor 450 and determines whether the first round-trip time (TD1) or the second round-trip time (TD2) reaches a predetermined reference time. Herein, the predetermined reference time is originally set in the controller 510 by a designer, which is a reference of determining that dust exceeding a predetermined amount is accumulated in the dust tank 200. The embodiment uses a scheme of determining that the amount of dust reaches a predetermined amount when any one of the first round-trip time TD1 or the second round-trip time TD2 reaches a reference time. Otherwise, can use, as the determination reference, the case where the first round-trip time TD1 and the second round-trip time TD2 is reached in a predetermined reference time.

As a result of the determination in step (S17), when any one of the first round-trip time TD1 and the second round-trip time TD2 is longer than the reference time, it returns to step S16 to perform the previous steps. On the other hand, when the first round-trip time TD1 and the second round-trip time TD2 reach the reference time, the controller 510 displays the dust emptying signal in the signal display unit 530 (S18). The controller 510 turns-off the suction motor 550, such that dust is not sucked any more (S19). Herein, the reason of forcibly stopping the suction motor 550 is that when the amount of dust accumulated in the dust tank 220 exceeds the predetermined amount, if the dust suction operation is forcibly continued, the dust suction efficiency is reduced as well as overload can be applied to the suction motor 550. The controller 510 turns-off the compression motor 570 (S20). In the embodiment, the suction motor 550 and the compression motor 570 may be sequentially stopped or simultaneously stopped.

In the above-mentioned embodiment, the dust stored in the dust tank is compressed by the interaction of the first compression member and the second compression member, thereby making it possible to maximize the capacity of dust stored in the dust tank.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dust separating device for a vacuum cleaner, the dust separating device comprising:
   a dust separating unit including a first main body movably connected to a second main body, the dust separating unit configured to generate a cyclone airflow,
   wherein the second main body includes a plurality of sub bodies coupled together,
   wherein the first main body and the plurality of sub bodies define a cyclone chamber in which the cyclone airflow is generated,
   wherein the plurality of sub bodies comprises a first sub body and a second sub body directly coupled to the first sub body in a direction parallel to an axis of the cyclone airflow,
   wherein the first main body is coupled to the first sub body in a direction substantially perpendicular to the axis of the cyclone airflow, and
   wherein the first main body defines a portion of the cyclone chamber and the plurality of sub bodies defines another portion of the cyclone chamber.

2. The device of claim 1, wherein the first sub body includes a first filter extending along the axis of the cyclone air flow and the second sub body includes a second filter extending along the axis of the cyclone air flow, and the first filter is spaced apart from the second filter.

3. The device of claim 2, wherein each of the first and second sub bodies includes a hinge coupling portion, and the first main body is movably connected to the second main body at the hinge coupling portions.

4. The device of claim 2, wherein each of the first and second sub bodies includes a suction portion to receive an air flow containing dust, and each of the first and second sub bodies include an air discharge portion.

5. The device of claim 4, wherein the first main body includes a dust discharge portion to discharge dust removed from the air flow containing dust.

6. The device of claim 5, further comprising a filter unit connected to the dust separating unit to receive air from each of the air discharge portions.

7. The device of claim 1, further comprising a filter unit connected to the dust separating unit to receive air from the plurality of air discharge portions.

8. The device of claim 7, wherein the filter unit includes a first case coupled to the dust separating unit, a second case movably connected to the first case, and a filter located between the first and second cases.

9. The device of claim 8, wherein the first case includes a plurality of opening portions to receive air from the plurality of air discharge portions of the second main body.

10. The device of claim 9, wherein the second case includes a discharge hole, the filter being located between the plurality of opening portions and the discharge hole.

11. The device of claim 9, wherein the first case includes at least one noise reducing portion in each of the plurality of opening portions.

12. A vacuum cleaner comprising:
   a main vacuum cleaner body; and
   a dust separating device including a dust separating unit and a filter unit, the dust separating device being detachably mounted to the main vacuum cleaner body,
   wherein the dust separating unit includes a plurality of main bodies and the plurality of main bodies defines a cyclone chamber in which cyclone airflow is generated,
   wherein the plurality of main bodies includes a first main body movably connected to a second main body in a direction substantially perpendicular to an axis of the cyclone airflow,
   wherein the second main body includes a first sub body and a second sub body coupled to the first sub body in a direction parallel to the axis of the cyclone airflow, and
   wherein the first main body defines a portion of the cyclone chamber and the first and second sub bodies define another portion of the cyclone chamber.

13. The vacuum cleaner of claim 10, wherein each of the first and second sub bodies includes a hinge coupling portion, and the first main body is movably connected to the second main body at the hinge coupling portions.

14. The vacuum cleaner of claim 10, wherein each of the first and second sub bodies includes a suction portion to receive an air flow containing dust, and each of the first and second sub bodies include an air discharge portion.

15. The vacuum cleaner of claim 12, wherein the filter unit includes a first case coupled to the dust separating unit, a second case movably connected to the first case, and a filter located between the first and second cases.

16. The vacuum cleaner of claim 13, further comprising a dust tank detachably mounted to the main vacuum cleaner body, the dust tank being provided separately from the dust separating unit.

17. The vacuum cleaner of claim 13, further comprising a cover member movably attached to the main vacuum cleaner body, the cover member being configured to at least partially cover the dust separating device in a closed position.

18. A dust separating device for a vacuum cleaner, the dust separating device comprising:
- a dust separating unit including a first main body movably connected to a second main body,
- wherein the second main body includes a plurality of sub bodies coupled together,
- wherein the first main body and the plurality of sub bodies define a cyclone chamber in which cyclone airflow is generated,
- wherein the plurality of sub bodies includes a first sub body having a first suction portion and a second sub body having a second suction portion,
- wherein the first main body includes a dust discharge portion through which dust separated from air in the cyclone chamber is discharged, and
- wherein the first main body and the first sub body is configured to generate a first cyclone airflow and the first main body and the second sub body is configured to generate a second cyclone airflow, and each of the first and second cyclone airflows moves dust in mutually convergent directions toward the dust discharge portion.

* * * * *